United States Patent
Hong et al.

(10) Patent No.: US 10,318,026 B2
(45) Date of Patent: Jun. 11, 2019

(54) TOUCH WINDOW

(71) Applicant: LG INNOTEK CO., LTD., Seoul (KR)

(72) Inventors: Beom Sun Hong, Seoul (KR); Kyoung Jin Kim, Seoul (KR); Mun Suk Kang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 845 days.

(21) Appl. No.: 14/622,168

(22) Filed: Feb. 13, 2015

(65) Prior Publication Data

US 2016/0162060 A1    Jun. 9, 2016

(30) Foreign Application Priority Data

Dec. 9, 2014 (KR) .................. 10-2014-0176122
Dec. 26, 2014 (KR) .................. 10-2014-0190411

(51) Int. Cl.
*G06F 3/041* (2006.01)
*B32B 3/10* (2006.01)
*G06F 3/044* (2006.01)

(52) U.S. Cl.
CPC .............. *G06F 3/041* (2013.01); *B32B 3/10* (2013.01); *G06F 3/044* (2013.01); *B32B 2307/418* (2013.01); *B32B 2457/208* (2013.01)

(58) Field of Classification Search
CPC ...... B32B 2457/208; B32B 3/10; G06F 3/041
See application file for complete search history.

(56) References Cited

U.S. PATENT DOCUMENTS

| | | | |
|---|---|---|---|
| 2010/0013784 A1 | 1/2010 | Nashiki et al. | |
| 2010/0087307 A1 | 4/2010 | Murata et al. | |
| 2013/0194220 A1* | 8/2013 | Lee | G06F 3/041 |
| | | | 345/173 |
| 2013/0256105 A1* | 10/2013 | Lim | H03K 17/96 |
| | | | 200/275 |
| 2014/0071637 A1 | 3/2014 | Hsu et al. | |
| 2014/0240619 A1 | 8/2014 | Yokohama et al. | |
| 2014/0367242 A1 | 12/2014 | Chen et al. | |
| 2015/0041303 A1* | 2/2015 | Cao | G06F 3/044 |
| | | | 200/600 |
| 2016/0162060 A1 | 6/2016 | Hong et al. | |

FOREIGN PATENT DOCUMENTS

| | | |
|---|---|---|
| CN | 103052931 A | 4/2013 |
| CN | 203480457 U | 3/2014 |
| CN | 105988623 A | 10/2016 |

(Continued)

OTHER PUBLICATIONS

Machine translation of JP2013176988A.*

(Continued)

*Primary Examiner* — Ian A Rummel
(74) *Attorney, Agent, or Firm* — Saliwanchik, Lloyd & Eisenschenk

(57) ABSTRACT

Disclosed is a touch window including a cover substrate, a first intermediate layer on the cover substrate, an electrode layer on the first intermediate layer, and a second intermediate layer provided on the first intermediate layer. The first intermediate layer has a refractive index different from a refractive index of the second intermediate layer.

16 Claims, 13 Drawing Sheets

(56) References Cited

FOREIGN PATENT DOCUMENTS

| | | | |
|---|---|---|---|
| DE | 202014004989 U1 | | 10/2014 |
| JP | 2013176988 A | * | 9/2013 |
| JP | 2014188843 A | | 10/2014 |
| KR | 10-2010-0019480 A | | 2/2010 |
| KR | 10-2012-0058397 A | | 6/2012 |
| KR | 1020130092340 A | | 8/2013 |
| KR | 10-2014-0107113 A | | 9/2014 |
| TW | M472238 U | | 2/2014 |
| TW | 201411661 A1 | | 3/2014 |
| TW | M515148 U | | 1/2016 |

OTHER PUBLICATIONS

European Search Report dated Jun. 23, 2015 in European Application No. 15155218.9.

Office Action dated Oct. 5, 2016 in Taiwanese Application No. 104105520.

Office Action dated Jul. 3, 2018 in Chinese Application No. 201510086512.9, with its English Translation.

* cited by examiner

TOUCH WINDOW

CROSS-REFERENCES TO RELATED APPLICATIONS

This application claims the benefit under 35 U.S.C. § 119 of Korean Patent Application Nos. 10-2014-0176122, filed Dec. 9, 2014, and 10-2014-0190411, filed Dec. 26, 2014, which are herein incorporated by reference in their entirety.

BACKGROUND

The embodiment relates to a touch window.

Recently, a touch window, which performs an input function through the touch of an image displayed on a display by an input device, such as a stylus pen or a finger, has been applied to various electronic appliances.

The touch window may be formed in various types according to the position of an electrode. For example, the electrode may be formed only on one surface of a cover substrate, or may be formed on one surface of the cover substrate and a substrate.

In this case, when the electrode is directly provided on the cover substrate, the strength of the cover substrate may be deteriorated in the process of forming the electrode, so that the reliability of the touch window may be degraded.

Therefore, the touch window having a novel structure capable of solving the above problem is required.

BRIEF SUMMARY

The embodiment provides a touch window having improved reliability and improved visibility.

According to the embodiment, there is provided a touch window including a cover substrate, a first intermediate layer on the cover substrate, an electrode layer on the first intermediate layer, and a second intermediate layer on the electrode layer. The first intermediate layer has a refractive index different from a refractive index of the second intermediate layer.

As described above, according to the touch window of the embodiment, the strength of the cover substrate can be enhanced. In other words, according to the touch window of the embodiment, the first intermediate layer can be provided on the cover substrate, the electrode layer can be provided on the first intermediate layer, and the second intermediate layer can be provided on the electrode layer. Accordingly, the strength of the cover substrate can be prevented from being deteriorated due to the process of forming the electrode layer. In other words, the electrode layer is not directly formed on the cover substrate, but the intermediate layer is provided on the cover substrate and then the electrode layer is formed on the intermediate layer. Accordingly, the direct influence of external impact to be applied to the cover substrate in the process of forming the electrode layer can be reduced. Therefore, as the strength of the cover substrate can be prevented from being deteriorated, the reliability of the touch window can be improved.

In addition, the touch window according to the embodiment may have improved visibility. In other words, the touch window may have improved reliability as the first and second intermediate layers having mutually different refractive indexes are provided.

In addition, according to the touch window of the embodiment, the adhesive strength of the electrode can be enhanced. In other words, according to the touch window of the embodiment, as the third intermediate layer is provided on the first intermediate layer, and the electrode layer is provided on the third intermediate layer, the electrode can be prevented from being delaminated, and the improved reliability can be represented.

DETAILED DESCRIPTION

Figure 1:
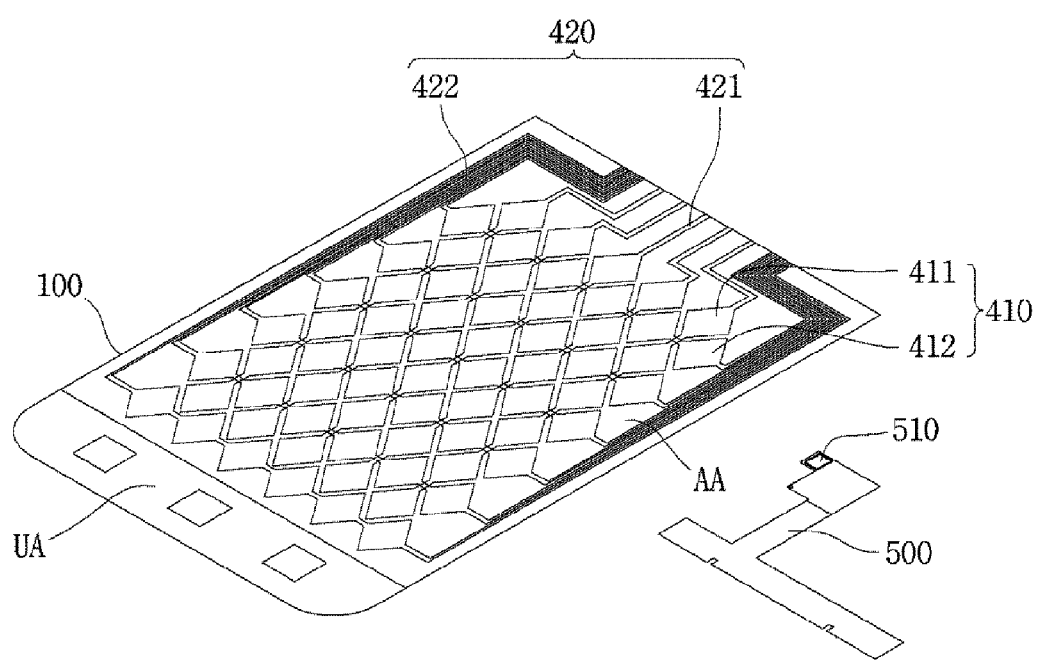
FIG. 1 is a perspective view showing a touch window according to a first embodiment.
Figure 2:
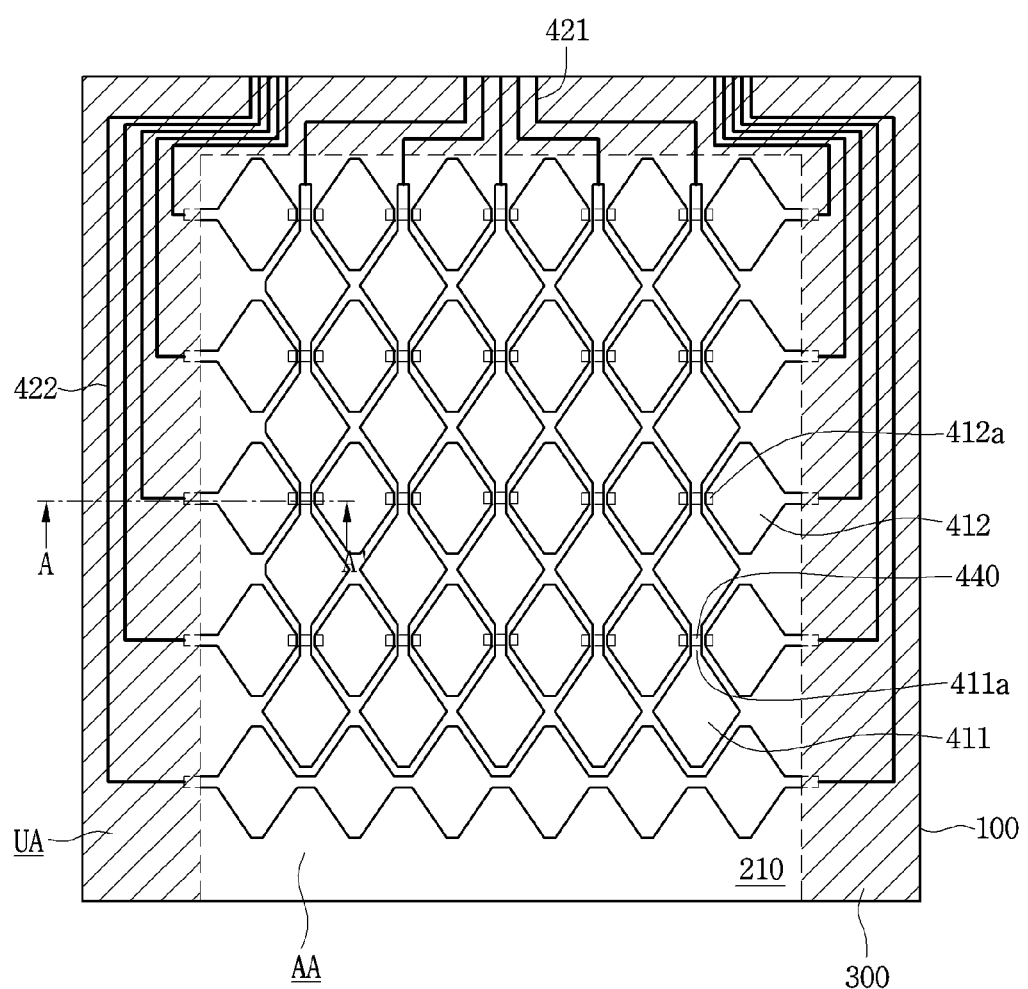
FIG. 2 is a plan view showing a touch window according to the first embodiment.

In the following description of the embodiments, it will be understood that, when a layer (film), a region, a pattern, or a structure is referred to as being "on" or "under" another layer (film), another region, a pad, or patterns, it can be "directly" or "indirectly" on the other layer, film, region, or plate, or one or more intervening layers may also be present. Such a position of the layer has been described with reference to the drawings.

In the following description, when a predetermined part "is connected to" another part, this means not only that the predetermined part is directly connected to another part, but also that the predetermined is indirectly connected to another part while interposing another component between the predetermined part and another part. In addition, when a predetermined part "includes" a predetermined component, the predetermined part does not exclude other components, but may further include other components if there is a specific opposite description.

The thickness and size of each layer (film), region, or pattern, or structures shown in the drawings may be modified for the purpose of convenience or clarity. In addition, the size of elements does not utterly reflect an actual size.

Hereinafter, the embodiment will be described in detail with reference to accompanying drawings.

Referring to FIGS. 1 to 7, a touch window 10 according to a first embodiment may include a cover substrate 100, an intermediate layer, a printing layer 300, an electrode layer, and a printed circuit board 500.

The cover substrate 100 may support the intermediate layer, the printing layer 300, the electrode layer, and the printed circuit board 500. In other words, the cover substrate 100 may include a support substrate.

The cover substrate 100 may be flexible or rigid. For example, the cover substrate 100 may include glass or plastic.

In detail, the cover substrate 100 may include chemically tempered/semi-tempered glass, such as soda lime glass or aluminosilicate glass, reinforced or soft plastic, such as polyimide (PI), polyethylene terephthalate (PET), propylene glycol (PPG), or polycarbonate (PC), or sapphire.

The sapphire has superior electric characteristics, such as permittivity, so that a touch response speed may be remarkably increased and a space touch, such as hovering, may be easily implemented. The hovering signifies a technique of recognizing coordinates even at a short distance from a display.

In addition, the cover substrate 100 is bendable while a portion of the cover substrate 100 has a curved surface. In other words, the substrate is bendable while a portion of the substrate has a flat surface and another portion of the substrate has a curved surface. In detail, an end portion of the cover substrate 100 may be bent with a curved surface or may be curved or bent with a surface having a random curvature.

In addition, the cover substrate 100 may include a flexible substrate having a flexible property.

In addition, the cover substrate 100 may include a curved substrate or a bended substrate. In other words, the touch window including the cover substrate 100 may be formed with a flexible, curving, or bending characteristic. Accordingly, the touch window according to the embodiment can be easily carried by a user and may be modified to touch windows having various designs.

The cover substrate 100 may have an active area AA and an unactive area UA defined therein.

An image may be displayed on the active area AA. The image may not be displayed on the unactive area UA provided at a peripheral portion of the active area AA.

In addition, a position of an input device (e.g., finger) can be detected at least one of the active area AA and the unactive area UA. If the input device such as the finger touches the touch window, the variation of capacitance occurs in the touched part by the input device, and the touched part subject to the variation of the capacitance may be detected as a touch point.

Referring to FIGS. 3 to 7, the intermediate layer may include first and second intermediate layers 210 and 220. For example, the intermediate layer may include the first intermediate layer 210 provided on the cover substrate 100 and the second intermediate layer 220 provided on the first intermediate layer 210.

The first intermediate layer 210 may be provided on the cover substrate 100. For example, the first intermediate layer 210 may make contact with one surface of the cover substrate 100. In detail, the first intermediate layer 210 may directly make contact with one surface of the cover substrate 100.

The first intermediate layer 210 may be provided on an entire surface of the cover substrate 100 or may be partially provided on the cover substrate 100.

For example, the first intermediate layer 210 may be provided on at least one of the active area AA and the unactive area UA of the cover substrate 100. For example, the first intermediate layer 210 may be provided only on the active area AA of the cover substrate 100, or may be provided on the entire surface of the cover substrate 100, that is, on both of the active area AA and the unactive area UA of the cover substrate 100.

The first intermediate layer 210 may include resin. For example, the first intermediate layer 210 may include an organic substance. In other words, the first intermediate layer 210 may be an organic layer.

For example, the first intermediate layer 210 may include resin composition. For example, the first intermediate layer 210 may include photocurable resin composition. As an example, the first intermediate layer 210 may include acrylic resin composition.

The first intermediate layer 210 may reinforce the strength of the cover substrate 100. In detail, the first intermediate layer 210 is interposed between an electrode layer provided on the cover substrate 100 and the cover substrate 100 to prevent the strength of the cover substrate 100 from being deteriorated during the process of forming the electrode layer.

In other words, the first intermediate layer 210 can prevent impact from being directly applied to the cover substrate 100 during a deposition process or an etching process when the electrode layer is deposited, thereby preventing the strength of the cover substrate 100 from being deteriorated.

Therefore, according to the touch window of the embodiment, the strength of the cover substrate can be prevented from being deteriorated, so that reliability can be improved.

The first intermediate layer 210 may have a thickness of about 1 µm to about 15 µm. In detail, the first intermediate layer 210 may have the thickness of about 1 µm to about 10 µm. When the first intermediate layer 210 is provided with a thickness of about 1 µm or less, the strength of the cover substrate may be deteriorated during the process of forming the electrode layer. When the first intermediate layer 210 is provided with a thickness exceeding about 15 µm, the whole thickness of the touch window is increased due to the first intermediate layer, so that transmittance may be deteriorated.

The printing layer 300 may be provided on the unactive area UA of the cover substrate 100.

Figure 3:
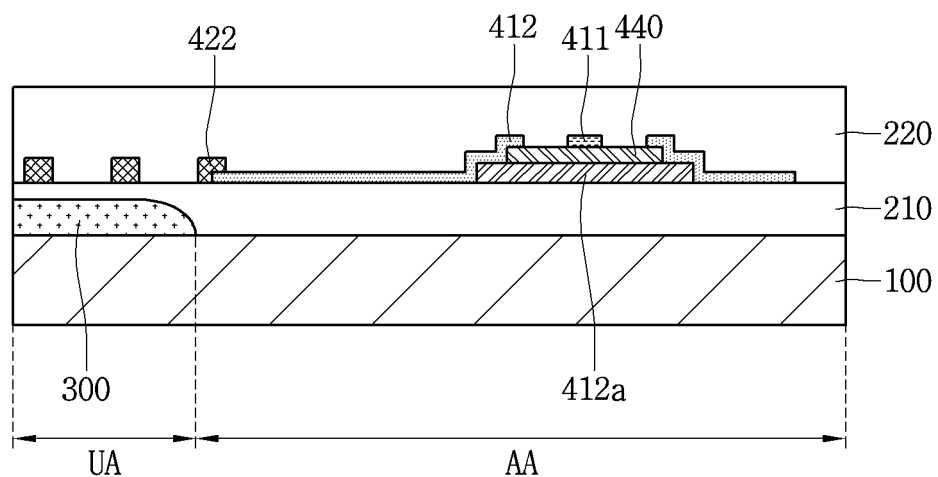
FIGS. 3 to 7 are sectional views taken along line A-A' of FIG. 2.

Referring to FIG. 3, the printing layer 300 may be provided on the unactive area UA of the cover substrate 100, and the first intermediate layer 210 may be provided on the active area AA and the unactive area UA of the cover substrate 100. The first intermediate layer 210 may surround the printing layer 300. First and second wire electrodes 421 and 422 may be spaced apart from the printing layer 300.

The step difference between the cover substrate 100 and the printing layer 300 can be reduced due to the first intermediate layer 210, thereby preventing an electrode from being cracked or disconnected due to the step difference.

In addition, since the electrode is not provided on the printing layer, the damage to the electrode caused by high surface roughness of the printing layer can be prevented.

Figure 4:
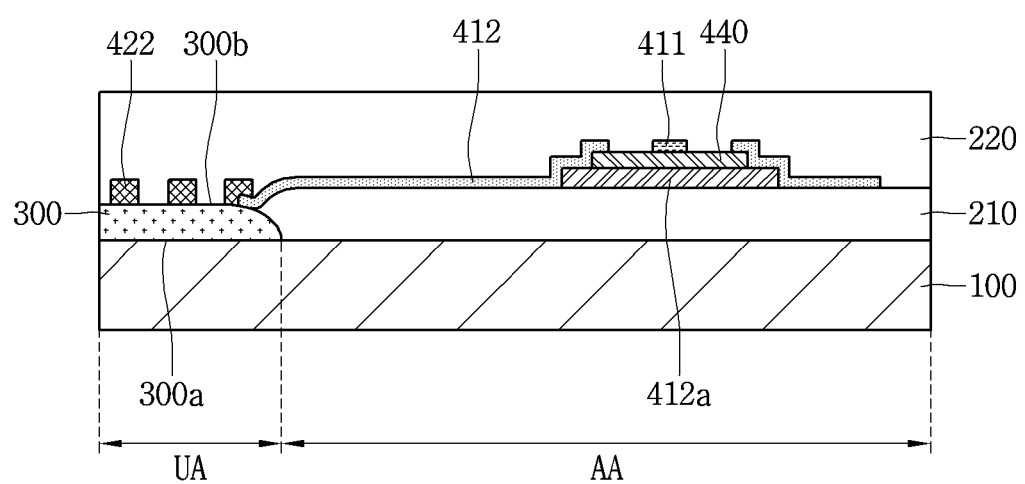

Referring to FIG. 4, the cover substrate 100 may include the active area AA and the unactive area UA provided along an outer portion of the active area AA.

The printing layer 300 may be provided on the unactive area UA of the cover substrate 100. The first intermediate layer 210 may be provided on both of the cover substrate 100 and the printing layer 300. The first intermediate layer 210 may be provided thereon with sensing electrodes 411 and 412. The second intermediate layer 220 may be provided on the sensing electrodes 411 and 412.

One surface 300a of the printing layer 300 may make contact with the cover substrate 100. An opposite surface 300b opposite to the one surface 300a of the printing layer 300 may make contact with the first intermediate layer 210.

One surface 300a of the printing layer 300 may directly or indirectly make contact with the cover substrate 100. The opposite surface 300b opposite to the one surface 300a of the printing layer 300 may directly or indirectly make contact with the first intermediate layer 210.

For example, one surface 300a of the printing layer 300 may directly make contact with the cover substrate 100. The opposite surface 300b opposite to the one surface 300a of the printing layer 300 may directly make contact with the first intermediate layer 210.

In detail, the opposite surface 300b opposite to the one surface 300a of the printing layer 300 may directly and partially make contact with the first intermediate layer 210.

The first intermediate layer 210 may be provided in the active area AA, and may not be provided in the unactive area UA.

The meaning that the first intermediate layer 210 may be provided in the active area AA, and may not be provided in the unactive area UA may include the meaning that the first intermediate layer 210 may cover an entire portion of the active area AA.

For example, the meaning that the first intermediate layer 210 may be provided in the active area AA, and may not be provided in the unactive area UA may include the meaning that the first intermediate layer 210 may cover the entire portion of the active area AA and a portion of the unactive area UA while the first intermediate layer 210 may not cover a remaining portion of the unactive area UA.

The first intermediate layer 210 may be provided with a thickness equal to or approximate to that of the printing layer 300. Accordingly, the step difference between the cover substrate 100 and the printing layer 300 can be reduced due to the first intermediate layer 210, thereby preventing an electrode from being cracked or disconnected due to the step difference.

The printing layer 300 may be realized in various colors depending on required appearances.

The printing layer 300 may be formed by coating a material having a predetermined color so that the wire electrode provided on the cover substrate 100 and a printed circuit board connecting the wire electrode to the external circuit cannot be viewed from the outside. The printing layer 300 may have a color suitable for a desired outer appearance thereof. For example, the printing layer 300 includes black or white pigments so that the printing layer 300 may represent black or white.

In addition, various color films are employed so that various colors, such as red and blue, can be represented. In addition, a desired logo may be formed in the printing layer 300 layer 300 through various schemes. The printing layer 300 layer 300 may be formed through deposition, print, and wet coating schemes.

The printing layer 300 may be provided in at least one layer structure. For example, the printing layer 300 may be provided in one layer structure or may be provided in a structure of at least two layers having mutually different widths.

The electrode layer may be provided on the cover substrate 100. For example, the electrode layer may be provided on one surface of the first intermediate layer 210 on the cover substrate 100.

The electrode layer may include a sensing electrode 410 and a wire electrode 420. For example, the electrode layer may include the sensing electrode 410 provided on at least one of the active area AA and the unactive area UA of the cover substrate 100 and the wire electrode 420 provided on the unactive area UA.

For example, the sensing electrode 410 may be provided on the active area AA of the cover substrate 100.

The sensing electrode 410 may include a conductive material. For example, the sensing electrode 410 may include a transparent conductive material that allows electricity to flow there through without interrupting transmission of light. For example, the sensing electrode 410 may include metal oxide such as indium tin oxide (ITO), indium zinc oxide (IZO), copper oxide, tin oxide, zinc oxide, or titanium oxide.

However, the embodiment is not limited thereto, but the sensing electrode 410 may include a nanowire, a photo sensitive nanowire film, a carbon nanotube (CNT), graphene, conductive polymer, or the mixture thereof.

In addition, the sensing electrode 410 may include various metals. For example, the sensing electrode 410 may include at least one of metals including chromium (Cr), nickel (Ni), copper (Cu), aluminum (Al), silver (Ag), molybdenum (Mo), gold (Au), titanium (Ti), and the alloy thereof.

The sensing electrode 410 may include sub-electrodes crossing each other. The whole shape of the sensing electrode 410 may be a mesh shape by the sub-electrodes.

The sensing electrode 410 may include the first and second sensing electrodes 411 and 412.

The first sensing electrode 411 may extend in a first direction on the active area AA of the cover substrate 100. In detail, the first sensing electrode 411 may be provided on the first intermediate layer 210 provided on the cover substrate 100. One surface of the first intermediate layer 210 may make contact with one surface of the cover substrate 100, and the first sensing electrode 411 may make contact with the opposite surface of the first intermediate layer 210 opposite to one surface of the first intermediate layer 210.

In addition, the second sensing electrode 412 may extend in a second direction on the active area AA of the cover substrate 100. In detail, the second sensing electrode 412 may be provided on the first intermediate layer 210 provided on the cover substrate 100 while extending in the second direction different from the first direction. For example, the second sensing electrode 412 may directly make contact with the opposite surface of the first intermediate layer 210. In other words, the first and second sensing electrodes 411 and 412 may be provided on the same surface of the first intermediate layer 210 provided on the cover substrate 100 while extending in direction different from each other.

The first sensing electrode 411 and the second sensing electrode 412 may be insulated from each other on the first intermediate layer 210 provided on the cover substrate 100. In detail, first sensing electrodes 411 may be connected with each other by a first connection electrode 411a, and an insulating layer 440 is provided at the first connection electrode 411a. A second connection electrode 412a is provided on the insulating layer 440 to connect the second sensing electrodes 412 to each other.

Accordingly, the first sensing electrode 411 and the second sensing electrode 412 may not make contact with each other, but insulated from each other on the same surface of the first intermediate layer 210 provided on the cover substrate 100, that is, one surface of the active area AA.

The wire electrode 420 may be provided on the unactive area UA of the cover substrate 100. In detail, the wire electrode 420 may be provided on the printing layer 300. The wire electrode 420 may make contact with the printing layer 300 or the first intermediate layer 210.

For example, as shown in FIG. 3, when the first intermediate layer 210 surrounds the printing layer 300, the wire electrode 420 may make contact with the first intermediate layer 210.

In addition, as shown in FIG. 4, when the first intermediate layer 210 is provided in the active area AA of the cover substrate 100, and not provided or partially provided in the unactive area UA, the wire electrode 420 may make contact with the printing layer 300.

The wire electrode 420 may be provided on the first intermediate layer 210 or the printing layer 300, and may be connected with the sensing electrode 410.

The wire electrode 420 may include the first and second wire electrodes 421 and 422. For example, the wire electrode 420 may include the first wire electrode 421 connected with the first sensing electrode 411 and the second wire electrode 422 connected with the second sensing electrode 412. One end of the first wire electrode 421 and one end of the second wire electrode 422 may be connected with the sensing electrode 410, and opposite ends of the first and second wire electrodes 421 and 422 may be connected with the printed circuit board 500.

The wire electrode 420 may include a conductive material. For example, the wire electrode 420 may include a material the same as or similar to that of the sensing electrode described above.

The wire electrode 420 receives a signal of a touch sensed by the sensing electrode 410, and the touch signal may be transmitted to a driving chip mounted on the printed circuit board 500 electrically connected with the wire electrode 420 through the wire electrode 420.

The printed circuit board 500 may be a flexible printed circuit board (FPCB). The printed circuit board 500 may be connected with the wire electrode 420 provided on the unactive area UA. In detail, the printed circuit board 500 may be electrically connected with the wire electrode 420 on the unactive area UA through an anisotropic conductive film (ACF).

The driving chip 510 may be mounted on the printed circuit board 500. In detail, the driving chip 510 receives the signal of the touch sensed by the sensing electrode 410 from the wire electrode 420, so that the driving chip 510 may perform an operation according to the touch signal.

The second intermediate layer 220 may be provided on the first intermediate layer 210. For example, the second intermediate layer 220 may be provided on the electrode layer, so that the electrode layer may be interposed between the first intermediate layer 210 and the second intermediate layer 220.

The sensing electrode 410 may be connected with the wire electrode 420, and the second intermediate layer 220 may cover the sensing electrode 410 and the wire electrode 420.

The second intermediate layer 220 may cover at least one surface of a top surface and a lateral side of the sensing electrode 410. For example, the second intermediate layer 220 may cover the top surface and the lateral side of the sensing electrode 410.

The second intermediate layer 220 may cover at least one of the top surface and the lateral side of the wire electrode 420. For example, the second intermediate layer 220 may cover the top surface and the lateral side of the wire electrode 420.

The second intermediate layer 220 may include resin. For example, the second intermediate layer 220 may include an organic substance. In other words, the second intermediate layer 220 may be an organic layer.

In addition, the first intermediate layer 210 and the second intermediate layer 220 may include the same material or similar materials.

The first intermediate layer 210 and the second intermediate layer 220 may have refractive indexes different from each other. For example, the second intermediate layer 220 may have the refractive index greater than that of the first intermediate layer 210. For example, the difference in refractive index between the first and second intermediate layers 210 and 220 may be 0.2 or more. For example, the difference in refractive index between the first and second intermediate layers 210 and 220 may be in the range of 0.2 to 0.5. In detail, the difference in refractive index between the first and second intermediate layers 210 and 220 may be in the range of 0.2 to 0.3.

If the difference in refractive index between the first and second intermediate layers 210 and 220 is less than about 0.2, the electrode is viewed from the outside, so that the visibility may be deteriorated.

In addition, the second intermediate layer 220 may protect the electrode from external impact. In other words, the second intermediate layer 220 may be a protective layer provided on the electrode layer to protect the sensing electrode or the wire electrode from the external impact.

The first intermediate layer 210 and the second intermediate layer 220 may be provided at an equal thickness or different thicknesses.

For example, the thickness of the second intermediate layer 220 may be in the range of about 1 μm to about 10 μm. For example, the thickness of the second intermediate layer 220 may be in the range of about 1 μm to about 5 μm. In detail, the thickness of the second intermediate layer 220 may be in the range of about 1.5 μm to about 3 μm. When the thickness of the second intermediate layer 220 is less than 1 μm, the second intermediate layer 220 may protect the electrode from the external impact. In addition, when the thickness of the second intermediate layer 220 exceeds about 10 μm, the whole thickness of the touch window may be increased due to the second intermediate layer, and the transmittance may be deteriorated.

Figure 5:
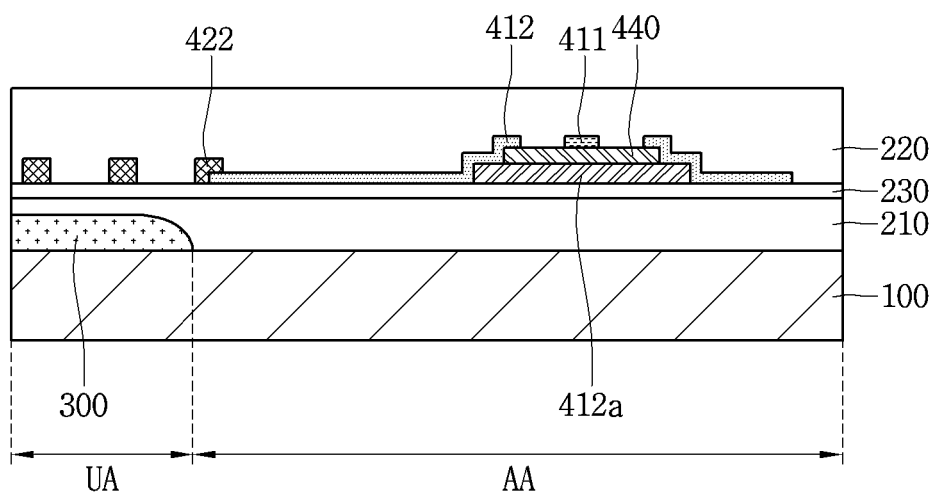
Figure 6:
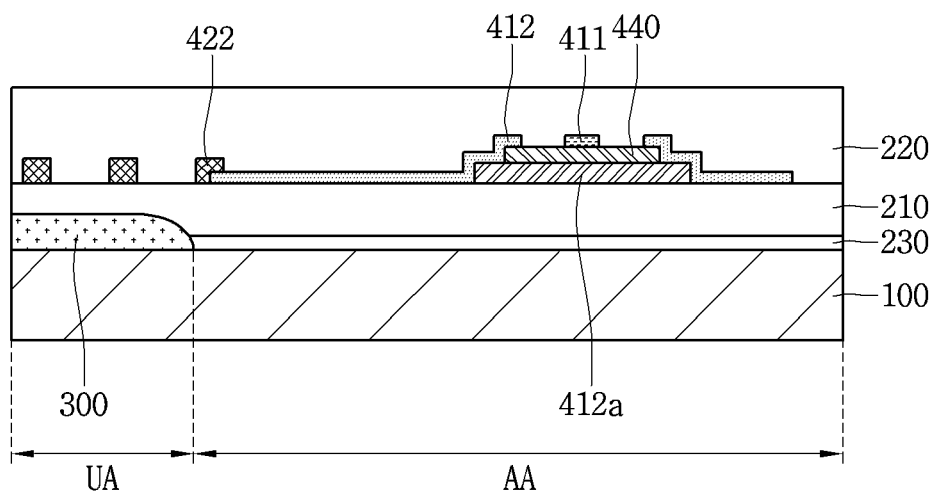
Figure 7:
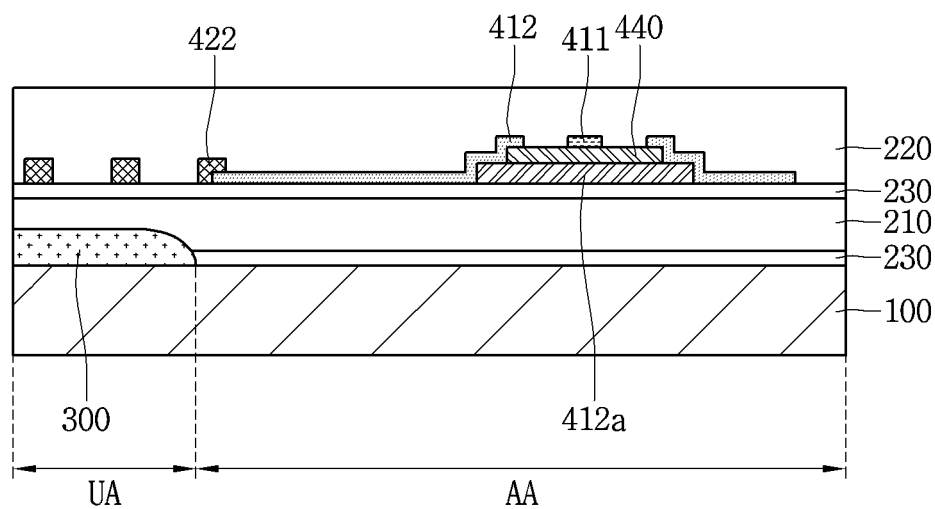
Figure 8:
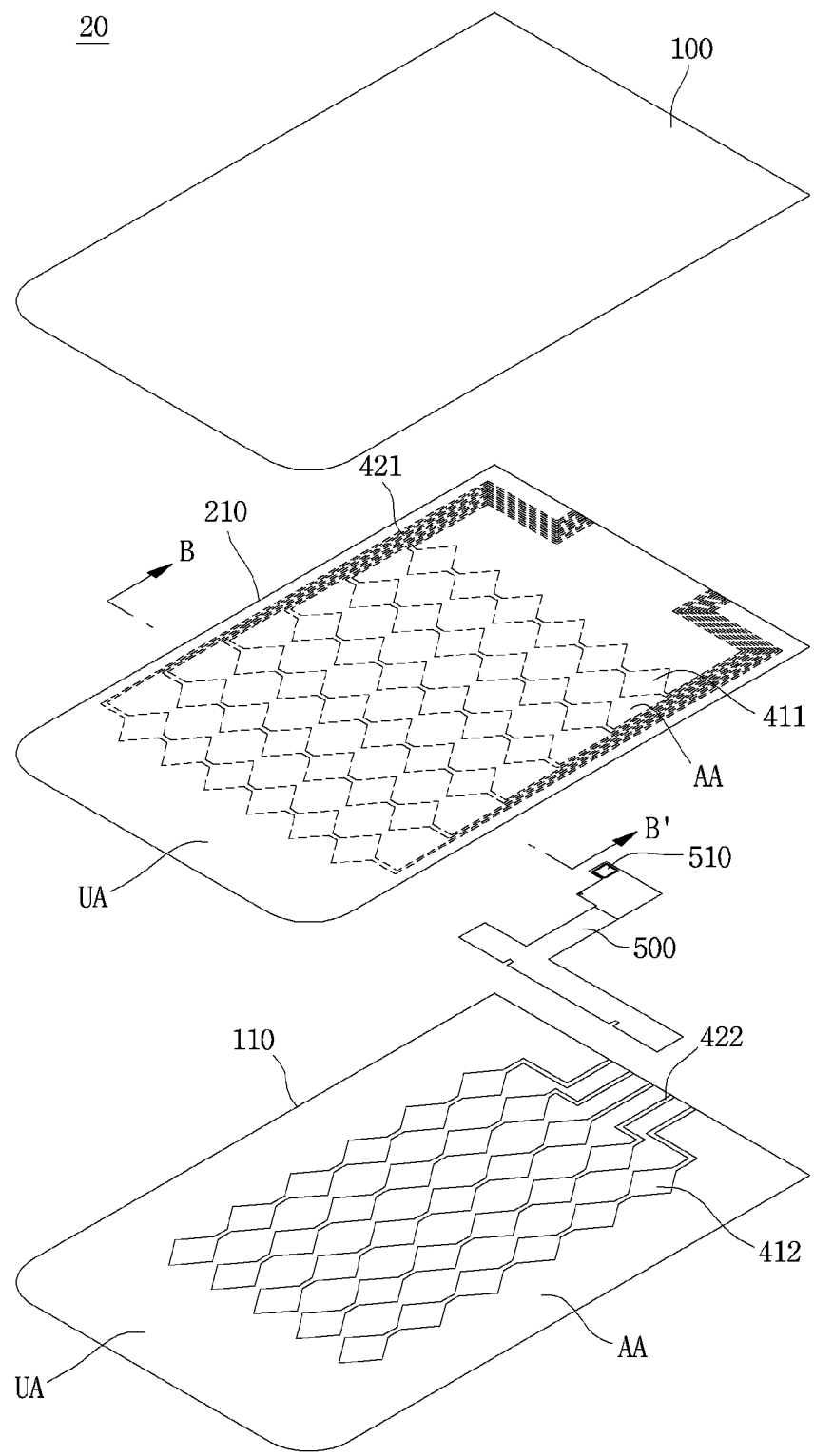
FIG. 8 is a perspective view showing a touch window according to a second embodiment.

Referring to FIGS. 5 to 7, the intermediate layer may further include a third intermediate layer 230. The third intermediate layer 230 may be provided on the first intermediate layer 210. For example, the third intermediate layer 230 may be provided on at least one of one surface and the opposite surface of the first intermediate layer 210.

Referring to FIG. 5, the third intermediate layer 230 may be provided on one surface of the first intermediate layer 210. For example, the third intermediate layer 230 may be provided on a surface of the first intermediate layer 210 opposite to the contact surface between the first intermediate layer 210 and the cover substrate 100.

Referring to FIG. 6, the third intermediate layer 230 may be provided on the opposite surface of the first intermediate layer 210. For example, the third intermediate layer 230 may be interposed between the first intermediate layer 210 and the cover substrate 100.

Referring to FIG. 7, third intermediate layers 230 may be provided on both of one surface and the opposite surface of the first intermediate layer 210. For example, the third intermediate layer 230 may be interposed between the first intermediate layer 210 and the cover substrate 100, and provided on a surface opposite to the contact surface between the first intermediate layer 210 and the cover substrate 100.

The third intermediate layer 230 may include a material different from a material constituting at least one of the first intermediate layer 210 and the second intermediate layer 220.

For example, the third intermediate layer 230 may include an inorganic substance. In other words, the third intermediate layer 230 may an inorganic layer. For example, the third intermediate layer 230 may include an inorganic oxide layer. For example, the third intermediate layer 230 may include at least one selected from the group consisting of materials including $SiO_2$, $TiO_2$, $Fe_2O_3$, $ZrO_2$, $Al_2O_3$, $Y_2O_3$, MgO, and $Cr_2O_3$.

The third intermediate layer 230 may enhance the adhesive strength of the electrode layer, that is, the adhesive strength of the sensing electrode 410 and the wire electrode 420. In addition, the first intermediate layer 210 may be uniformly provided on the cover substrate 100 by the third intermediate layer 230, so that the surface quality of the first intermediate layer 210 can be improved.

The third intermediate layer 230 may be provided with a thickness equal to or different from those of the first intermediate layer 210 and the second intermediate layer 220.

For example, the thickness of the third intermediate layer 230 may be in the range of about 5 nm to about 30 nm. In detail, the thickness of the third intermediate layer 230 may be in the range of about 5 nm to about 20 nm. In more detail, the thickness of the third intermediate layer 230 may be in the range of about 10 nm to about 20 nm. If the thickness of the third intermediate layer 230 is less than about 5 nm, the adhesive strength between the first intermediate layer 210 and the electrode layer is deteriorated, so that the electrode layer may be delaminated, and the first intermediate layer 210 may not be uniformly deposited on the substrate. In addition, if the thickness of the third intermediate layer 230 exceeds about 30 nm, the whole thickness of the touch window may be increased.

For example, the total thickness of the touch window including the cover substrate 100, the first intermediate layer 210 on the cover substrate 100, the electrode layer on the first intermediate layer 210, and the second intermediate layer 220 on the electrode layer may be in the range of about 102 μm to about 627 μm.

For example, the total thickness of the touch window, which includes the cover substrate 100, the first intermediate layer 210 on the cover substrate 100, the electrode layer on the first intermediate layer 210, the second intermediate layer 220 on the electrode layer, and the third intermediate layer 230 on at least one of one surface and the opposite surface of the first intermediate layer 210, may be in the range of about 102 μm to about 627 μm.

Hereinafter, a touch window 20 according to the second embodiment will be described with reference to FIGS. 8 to 13. In the following description of the touch window according to the second embodiment, the details of the structure and the elements the same as those of the first embodiment described above will be omitted, and the same reference numerals will be assigned to the same elements.

Referring to FIGS. 8 to 13, the touch window 20 according to the second embodiment may further include a substrate 110 of the cover substrate 100.

The first and second intermediate layers 210 and 220 described above may be provided on the cover substrate 100. In detail, the first and second intermediate layers 210 and 220 may be interposed between the cover substrate 100 and the substrate 110.

Figure 9:
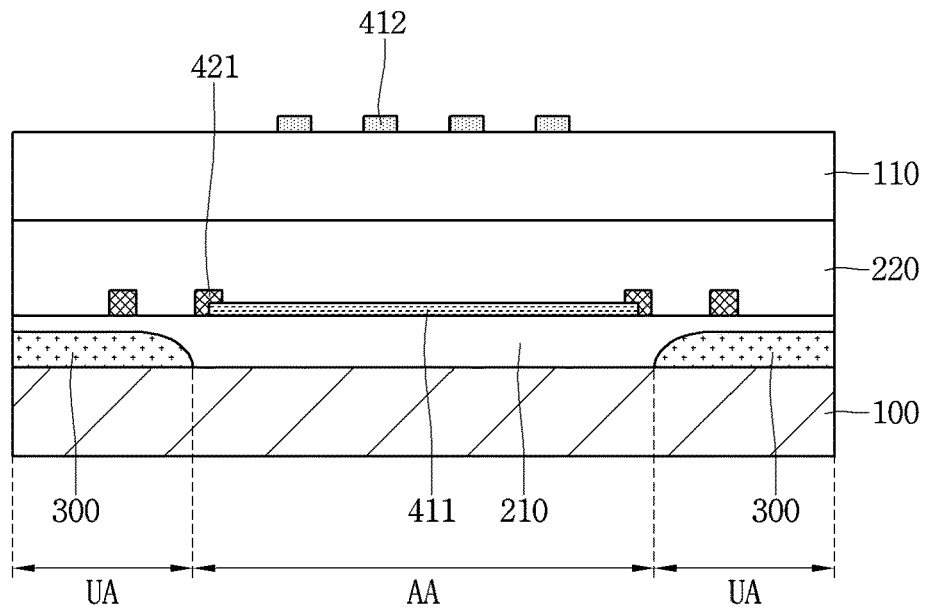
FIGS. 9 to 13 are sectional views taken along line B-B' of FIG. 8.

Referring to FIG. 9, the printing layer 300 may be provided on the unactive area UA of the cover substrate 100, and the first intermediate layer 210 may be provided on both of the active area AA and the unactive area UA of the cover substrate 100. The first intermediate layer 210 may surround the printing layer 300.

Accordingly, the step difference between the cover substrate 100 and the printing layer 300 can be reduced due to the first intermediate layer 210, thereby preventing the electrode from being cracked or disconnected due to the step difference.

In addition, since the wire electrode is provided on the intermediate layer instead of the printing layer, the damage to the wire electrode caused by high surface roughness of the printing layer can be prevented, so that the reliability of the touch window can be improved.

In addition, the electrode layer may be provided on one surface of the first intermediate layer 210. For example, the electrode layer may be provided on a surface opposite to the contact surface between the first intermediate layer 210 and the cover substrate 100.

For example, the first sensing electrode 411 may be provided on the first intermediate layer 210 corresponding to the active area of the cover substrate 100. The first sensing electrode 411 may be connected with the first wire electrode 421 provided on the first intermediate layer 210. The second intermediate layer 220 may be provided on the first intermediate layer 210. In detail, the second intermediate layer 220 may be provided on the electrode layer, that is, the first sensing electrode 411. For example, the second intermediate layer 220 may surround the electrode layer. In other words, the second intermediate layer 220 may directly make contact with the electrode layer, and may be interposed between the first intermediate layer 210 and the substrate 110.

The substrate 110 may be provided on the second intermediate layer 220, and may be provided thereon with the second sensing electrode 412 and the wire electrode 422. The substrate 110 may be bonded to the second intermediate layer 220 through an optical clear adhesive (OCA).

Figure 10:
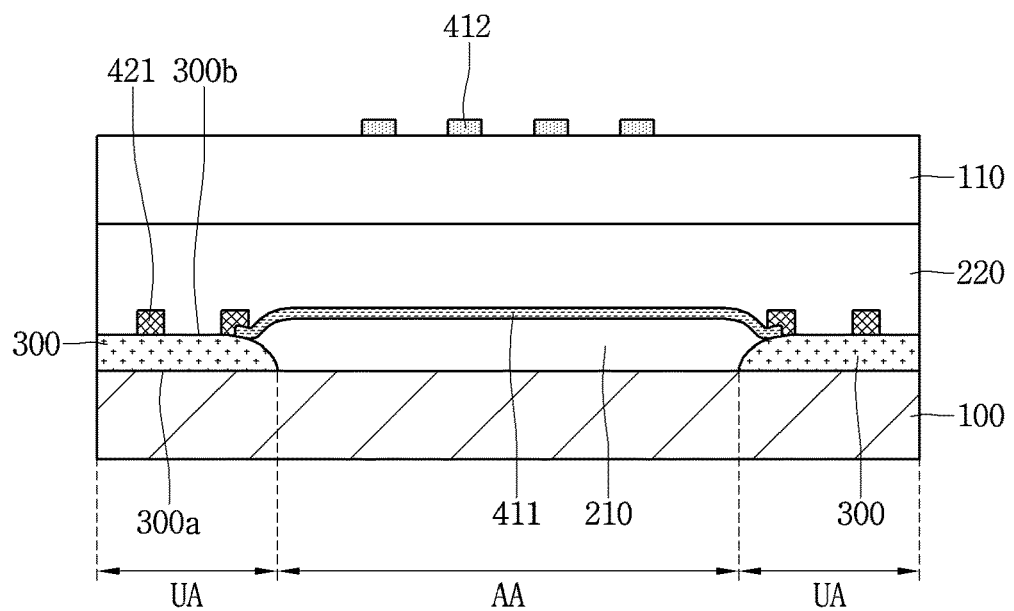

Referring to FIG. 10, the cover substrate 100 may include the active area AA and the unactive area UA provided along the outer portion of the active area AA.

The printing layer 300 may be provided on the unactive area UA of the cover substrate 100. The first intermediate layer 210 may be provided on the cover substrate 100 and the printing layer 300. The first sensing electrode 411 may be provided on the first intermediate layer 210.

The second intermediate layer 220 may be provided on the first sensing electrode 411. The second sensing electrode 412 may be provided on the second intermediate layer 220.

One surface 300a of the printing layer 300 may make contact with the cover substrate 100. The opposite surface 300b opposite to the one surface 300a of the printing layer 300 may make contact with the first intermediate layer 210.

One surface 300a of the printing layer 300 may directly or indirectly make contact with the cover substrate 100. The opposite surface 300b opposite to the one surface 300a of the printing layer 300 may directly or indirectly make contact with the first intermediate layer 210. When the printing layer 300 includes a plurality of layers, one surface 300a of the printing layer 300 refers to one surface of the printing layer most closely to the cover substrate 100, and the opposite surface 300b of the printing layer 300 refers to the opposite surface of the printing layer 300 which is farthest away from the cover substrate 100.

One surface 300a of the printing layer 300 may directly make contact with the cover substrate 100. The opposite surface 300b opposite to the one surface 300a of the printing layer 300 may directly make contact with the first intermediate layer 210.

In detail, the opposite surface 300b opposite to the one surface 300a of the printing layer 300 may partially and directly make contact with the first intermediate layer 210.

The first intermediate layer 210 may be provided in the active area AA or the unactive area UA.

The meaning that the first intermediate layer 210 may be provided in the active area AA, and may not be provided in the unactive area UA may include the meaning that the first intermediate layer 210 may cover an entire portion of the active area AA.

For example, the meaning that the first intermediate layer 210 may be provided in the active area AA, and may not be provided in the unactive area UA may include the meaning that the first intermediate layer 210 may cover the entire portion of the active area AA and a portion of the unactive area UA while the first intermediate layer 210 may not cover a remaining portion of the unactive area UA.

The first intermediate layer 210 may be provided with a thickness equal to or approximate to that of the printing layer 300. Accordingly, the step difference between the cover substrate 100 and the printing layer 300 can be reduced due to the first intermediate layer 210, thereby preventing an electrode from being cracked or disconnected due to the step difference.

The electrode layer may include first and second electrode layers which sense a touch position.

The first and second electrode layers may be provided at mutually different positions. For example, the first electrode layer may be provided on the first intermediate layer 210. The second electrode layer may be provided on the second intermediate layer 220.

In addition, the first and second electrode layers may extend in mutually different directions. For example, the first electrode layer crosses the second electrode layer.

The first electrode layer may include the first sensing electrode 411 and the first wire electrode 421 connected with the first sensing electrode 411. The second electrode layer may include the second sensing electrode 412 and the wire electrode 422 connected with the second sensing electrode 412.

The first and second sensing electrodes 411 and 412 may be provided at mutually different positions. For example, the first sensing electrode 411 may be provided on the first intermediate layer 210. The second sensing electrode 412 may be provided on the second intermediate layer 220.

In addition, the first and second sensing electrodes 411 and 412 may extend in mutually different directions. For example, the first sensing electrode 411 may cross the second sensing electrode 412. The first electrode layer may be provided on one surface of the first intermediate layer 210. For example, the first electrode layer may be provided on a surface opposite to the contact surface between the first intermediate layer 210 and the cover substrate 100.

For example, the first sensing electrode 411 may be provided on the first intermediate layer 210 corresponding to the active area of the cover substrate 100. The first sensing electrode 411 may be connected with the first wire electrode 421 provided on the printing layer 300 or the first intermediate layer 210.

The second intermediate layer 220 may be provided on the first intermediate layer 210. In detail, the second intermediate layer 220 may be provided on the first electrode layer. For example, the second intermediate layer 220 may surround the first electrode layer. In other words, the second intermediate layer 220 may directly make contact with the first electrode layer while being interposed between the first intermediate layer 210 and the substrate 110.

The substrate 110 may be provided on the second intermediate layer 220, and the substrate 110 may be provided thereon with the second sensing electrode 412 and the second wire electrode 422. The substrate 110 may be bonded to the second intermediate layer 220 through an OCA.

Figure 11:
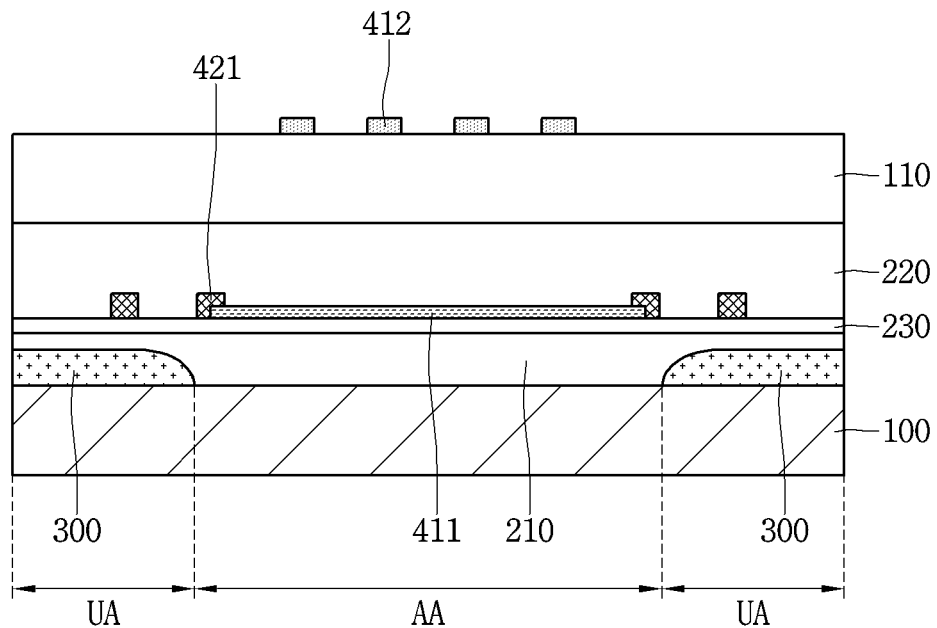
Figure 12:
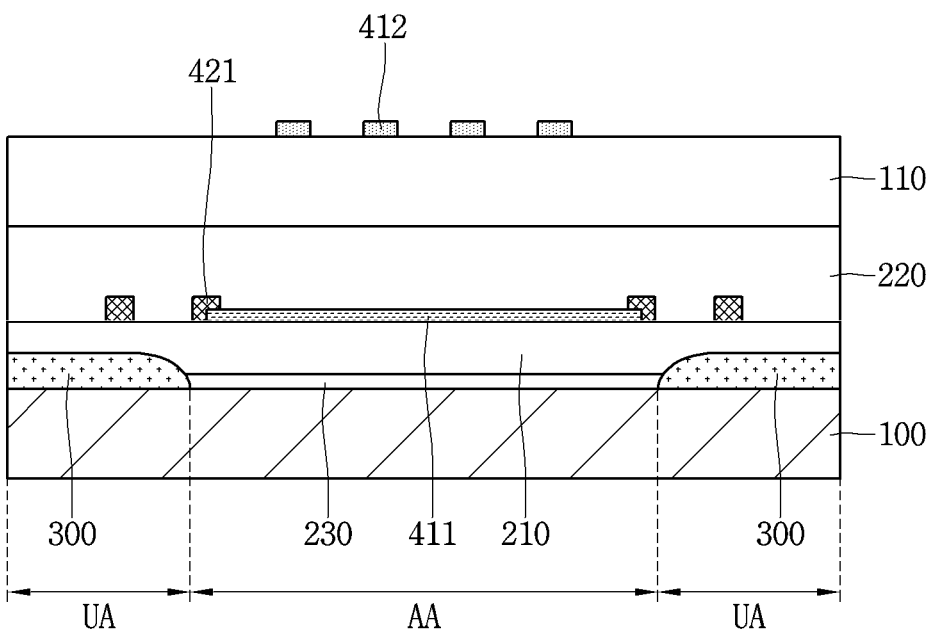
Figure 13:
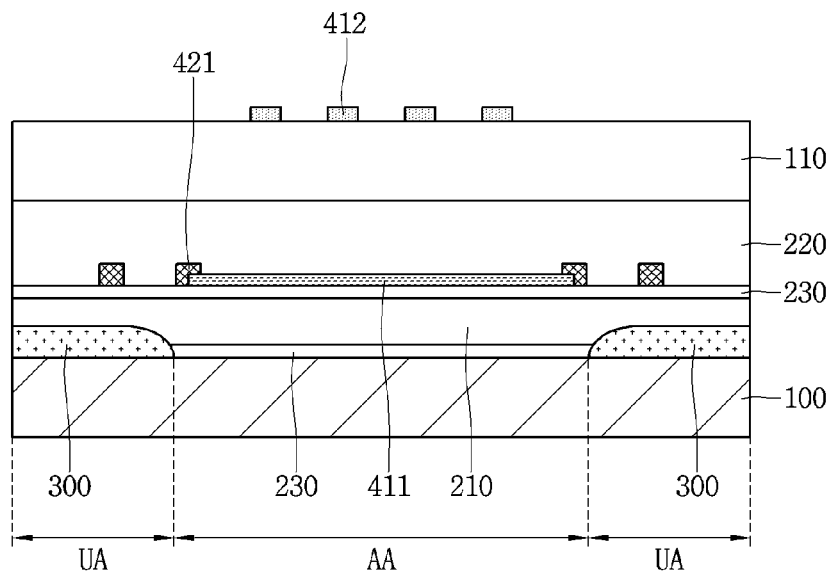

Referring to FIGS. 11 to 13, the intermediate layer may further include the third intermediate layer 230. The third intermediate layer 230 may be provided on the first intermediate layer 210. For example, the third intermediate layer 230 may be provided on at least one of one surface and the opposite surface of the first intermediate layer 210.

Referring to FIG. 11, the third intermediate layer 230 may be provided on one surface of the first intermediate layer 210. For example, the third intermediate layer 230 may be provided on the surface opposite to the contact surface between the first intermediate layer 210 and the cover substrate 100.

In addition, referring to FIG. 12, the third intermediate layer 230 may be provided on the opposite surface of the first intermediate layer 210. For example, the third intermediate layer 230 may be interposed between the first intermediate layer 210 and the cover substrate 100.

In addition, referring to FIG. 13, the third intermediate layer 230 may be provided on one surface and the opposite surface of the first intermediate layer 210. For example, the third intermediate layer 230 may be interposed between the first intermediate layer 210 and the cover substrate 100, and may be provided on a surface opposite to the contact surface between the first intermediate layer 210 and the cover substrate 100.

The third intermediate layer 230 may include a material different from that constituting at least one of the first intermediate layer 210 and the second intermediate layer 220. Since the material and the thickness of the third intermediate layer 230 are identical to those of the first embodiment described above, and the details thereof will be omitted.

Hereinafter, a touch device formed by assembling the above-described touch window with a display panel will be described with reference to FIGS. 14 to 17.

Figure 14:
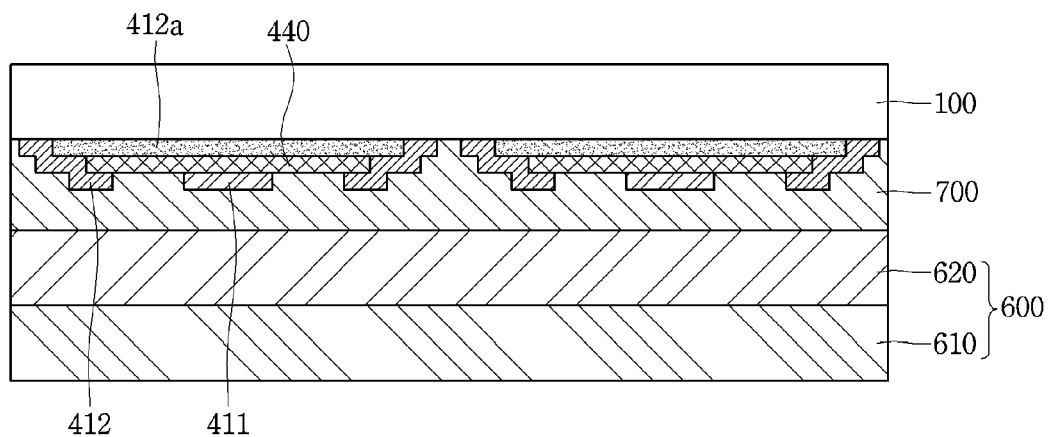
FIGS. 14 to 17 are sectional views showing a touch device formed by assembling the touch window according to the embodiment with a display panel.
Figure 15:
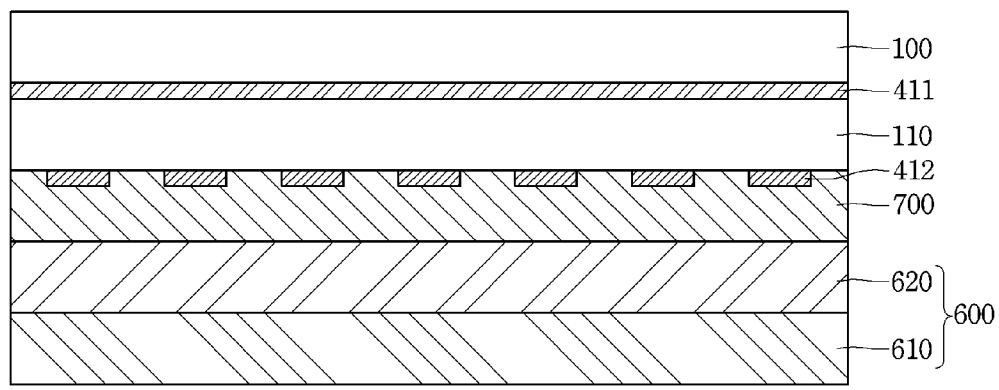

Referring to FIGS. 14 and 15, the touch device according to the embodiment may include a touch window provided on a display panel 600.

In detail, referring to FIG. 14, the touch device may be formed by assembling the cover substrate 100 with the display panel 600. The cover substrate 100 may be bonded to the display panel 600 through an adhesive layer 700. For example, the cover substrate 100 may be combined with the display panel 600 through the adhesive layer 700 including the OCA.

In addition, referring to FIG. 15, when the substrate 110 is additionally provided on the cover substrate 100, the touch device may be formed by assembling the substrate 110 with the display panel 600. The substrate 110 may be bonded to the display panel 600 through the adhesive layer 700. For example, the substrate 110 may be combined with the display panel 600 through the adhesive layer 700 including the OCA.

The display panel 600 may include first and second substrates 610 and 620.

When the display panel 600 is a liquid crystal display panel, the display panel 600 may be formed in a structure in which the first substrate 610 including a thin film transistor (TFT) and a pixel electrode is combined with the second substrate 620 including color filter layers while a liquid crystal layer is interposed between the first and second substrates 610 and 620.

In addition, the display panel 600 may be a liquid crystal display panel having a COT (color filter on transistor) structure in which a thin film transistor, a color filter, and a black matrix are formed on the first substrate 610, and the first substrate 610 is combined with the second substrate 620 while a liquid crystal layer is interposed between the first and second substrates 610 and 620. In other words, the thin film transistor may be formed on the first substrate 610, a protective layer may be formed on the thin film transistor, and the color filter layer may be formed on the protective layer. In addition, a pixel electrode making contact with the thin film transistor is formed on the first substrate 610. In this case, in order to improve the aperture rate and simplify the mask process, the black matrix may be omitted, and the common electrode may perform the inherent function thereof and the function of the black matrix.

In addition, when the display panel 600 is a liquid crystal panel, the display device may further include a backlight unit for providing light from the rear surface of the display panel 600.

When the display panel 600 is an organic electroluminescent display panel, the display panel 600 includes a self-light emitting device which does not require any additional light source. The display panel 600 includes a thin film transistor formed on the first substrate 610 and an organic light emitting device (OLED) making contact with the thin film transistor. The OLED may include an anode, a cathode and an organic light emitting layer formed between the anode and the cathode. In addition, the second substrate 620 may be further formed on the organic light emitting device to perform the function of an encapsulation substrate for encapsulation.

Figure 16:
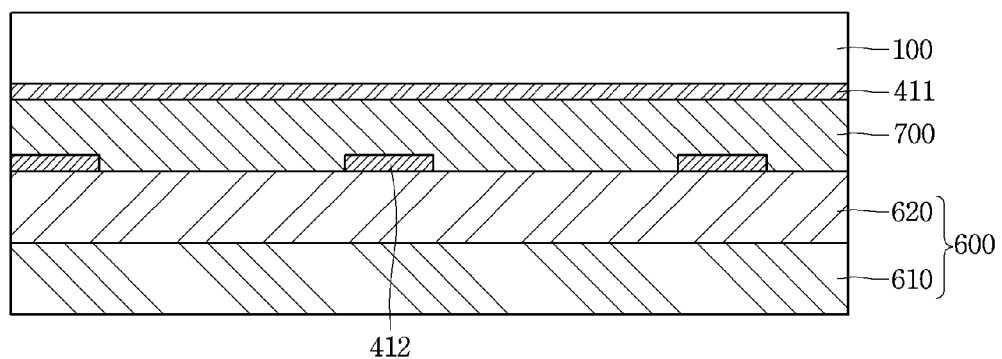

Referring to FIG. 16, the touch device according to the embodiment may include a touch window integrally formed with the display panel 600. In other words, the substrate to support at least one sensing electrode may be omitted.

In detail, at least one sensing electrode may be provided on at least one surface of the display panel 600. In other words, at least one sensing electrode may be formed on at least one surface of the first substrate 610 or the second substrate 620.

In this case, at least one sensing electrode may be formed on a top surface of a substrate disposed at an upper portion.

Referring to FIG. 16, the first sensing electrode 411 may be provided on one surface of the cover substrate 100. In addition, a first wire connected with the first sensing electrode 411 may be provided. The second sensing electrode 412 may be provided on one surface of the display panel 600. In addition, a second wire connected with the second sensing electrode 412 may be provided.

The adhesive layer 600 is interposed between the cover substrate 100 and the display panel 600, so that the cover substrate 100 may be combined with the display panel 600.

In addition, a polarizing plate may be additionally provided under the cover substrate 100. The polarizing plate may be a linear polarizing plate or an anti-reflection polarizing plate. For example, when the display panel 600 is a liquid crystal panel, the polarizing plate may be a linear polarizing plate. In addition, when the display panel 600 is an organic electroluminescent display panel, the polarizing plate may be an anti-reflection polarizing plate.

At least one substrate to support the sensing electrode may be omitted from the touch device according to the embodiment. Accordingly, a thin and light touch device can be formed.

Hereinafter, a touch device according to another embodiment will be described with reference to FIG. 17. Details of the structures and the elements the same as those of the previous embodiments will be omitted, and the same reference numerals will be assigned to the same elements.

Figure 17:
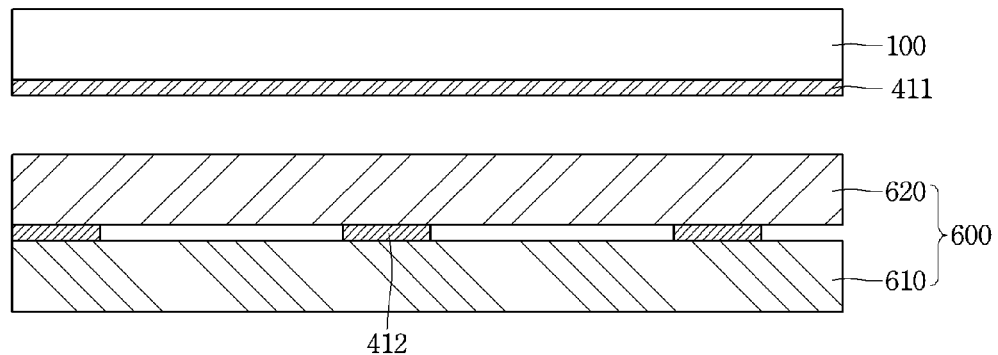

Referring to FIG. 17, the touch device according to the embodiment may include a touch window formed integrally with the display panel 600. In other words, a substrate to support at least one sensing electrode may be omitted.

For example, a sensing electrode provided in the active area to serve as a sensor which senses a touch and a wire to apply an electrical signal to the sensing electrode may be formed inside the display panel. In detail, at least one sensing electrode or at least one wire may be formed inside the display panel.

The display panel 600 includes the first substrate 610 and the second substrate 620. In this case, at least one of the first and second sensing electrodes 411 and 412 is interposed between the first substrate 610 and the second substrate 620. In other words, at least one sensing electrode may be provided on at least one surface of the first substrate 610 or the second substrate 620.

Referring to FIG. 17, the first sensing electrode 411 may be provided on one surface of the cover substrate 100. In addition, the first wire connected with the first sensing electrode 411 may be provided. The second sensing electrode 412 and the second wire may be interposed between the first substrate 610 and the second substrate 620. In other words, the second sensing electrode 412 and the second wire may be provided inside the display panel, and the first sensing electrode 411 and the first wire may be provided outside the display panel.

The second sensing electrode 412 and the second wire may be provided on the top surface of the first substrate 610 or the rear surface of the second substrate 620.

In addition, a polarizing plate may be additionally provided under the cover substrate 100.

When the display panel is a liquid crystal panel, and when the second sensing electrode is formed on the top surface of the first substrate 610, the second sensing electrode may be formed together with a thin film transistor (TFT) or a pixel electrode. In addition, when the second sensing electrode is formed on the rear surface of the second substrate 620, a color filter layer may be formed on the sensing electrode or the sensing electrode may be formed on the color filter layer. When the display panel is an organic electroluminescent display panel, and when the second sensing electrode is formed on the top surface of the first substrate 610, the second sensing electrode may be formed together with a thin film transistor or an organic light emitting device.

At least one substrate to support the sensing electrode may be omitted from the touch device according to the embodiment. Accordingly, a thin and light touch device can be formed. In addition, the sensing electrode and the wire are formed together with a device formed in the display panel, so that a process can be simplified and a cost can be reduced.

FIGS. 18 to 21 are views showing one example of a touch device employing a touch window according to the embodiment.

Figure 18:
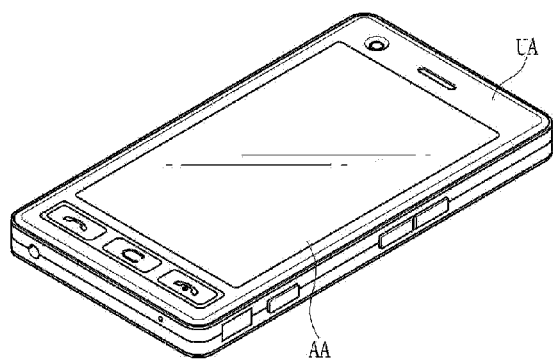
FIGS. 18 to 21 are views showing one example of a touch device employing a touch window according to the embodiment.

Referring to FIG. 18, a mobile terminal may include the active area AA and the unactive area UA. The active area AA is an area in which a touch signal is sensed due to the touch by a finger, and an instruction icon pattern part and a logo may be formed in the unactive area UA.

Figure 19:
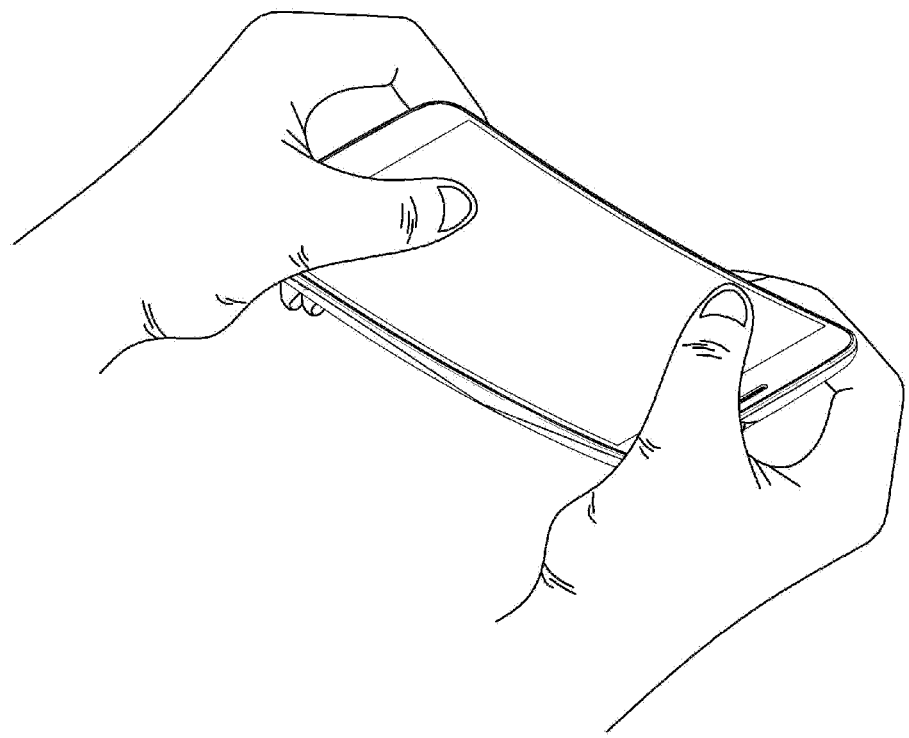

Referring to FIG. 19, the touch window may include a flexible touch window. Accordingly, the touch device including the touch window may be a flexible touch device. Accordingly, the touch device may be curved or bent by a hand of a user.

For example, the flexible touch window may be realized through a wearable touch scheme. In other words, the flexible touch window is applied to glasses or a clock put on a human body so that the flexible touch window can be realized through the wearable touch scheme.

Figure 20:
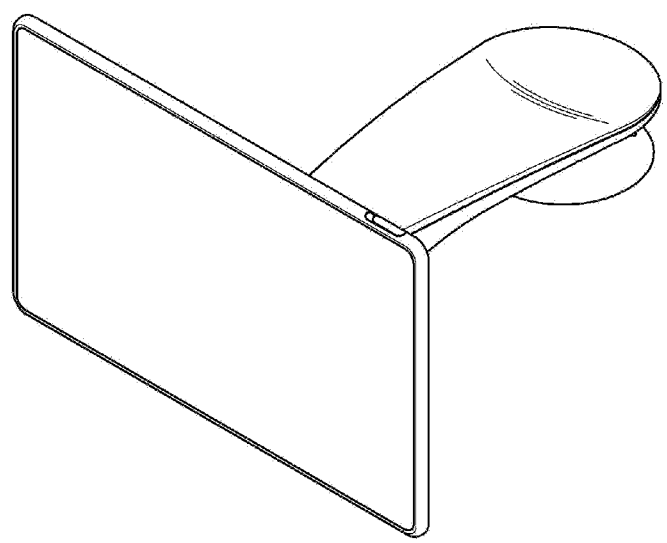

In addition, referring to FIG. 20, the touch window may be applied to a vehicle navigation system.

Figure 21:

Referring to FIG. 21, the touch window may be applied inside a vehicle. In other words, the touch window may be applied to various parts in the vehicle where the touch window is applied. Accordingly, the touch window is applied to a dashboard as well as a PND (Personal Navigation Display), thereby realizing a CID (Center Information Display). However, the embodiment is not limited thereto. In other words, the touch window may be used in various electronic products. In addition, the touch window may be applied to a wearable device put on a human body.

Hereinafter, the disclosure will be described in more detail based on embodiments and comparative examples. The embodiments and the comparative examples are provided to describe the disclosure in more detail for an illustrative purpose. Accordingly, the disclosure is not limited to the embodiment.

Embodiment 1

A first intermediate layer including a resin composition was provided on a cover substrate. An electrode layer was provided on the first intermediate layer. Accordingly, a second intermediate layer including resin composition was coated on the electrode layer.

In this case, the first and second intermediate layers included organic substances, and the electrode layer included a transparent electrode or metal.

The refractive index of the first intermediate layer was 1.54, and the refractive index of the second intermediate layer was 1.76.

The strength of the cover substrate was measured according to ring on ring strength evaluation.

In addition, measurement is made on whether an electrode pattern is viewed from an outside of the cover substrate.

Embodiment 2

Similarly to Embodiment 1, the broken state of the cover substrate and the viewing of the pattern were measured after forming the touch window except that the refractive index of the first intermediate layer was 1.54, and the refractive index of the second intermediate layer was 1.8.

Comparative Example 1

Similarly to Embodiment 1, the broken state of the cover substrate and the viewing of the pattern were measured after forming the touch window except that the electrode layer was provided on the cover substrate.

Comparative Example 2

Similarly to Embodiment 1, the broken state of the cover substrate and the viewing of the pattern were measured after forming the touch window except that an index matching layer was provided on the cover substrate and the electrode layer was provided on the index matching layer.

Comparative Example 3

Similarly to Embodiment 1, the viewing of the pattern was measured after forming the touch window except that the refractive index of the first intermediate layer was 1.54, and the refractive index of the second intermediate layer was 1.65.

TABLE 1

|  | Embodiment 1 | Embodiment 2 | Comparative example 1 | Comparative example 2 |
|---|---|---|---|---|
| 10 kg · f | Normal | Normal | Normal | Normal |
| 20 kg · f | Normal | Normal | Broken | Broken |
| 30 kg · f | Normal | Normal | Broken | Broken |
| 40 kg · f | Normal | Normal | Broken | Broken |
| 50 kg · f | Normal | Normal | Broken | Broken |
| 60 kg · f | Normal | Normal | Broken | Broken |

TABLE 2

|  | Visible Pattern |
|---|---|
| Embodiment 1 | No |
| Embodiment 2 | No |
| Comparative example 1 | Yes |
| Comparative example 2 | No |
| Comparative example 3 | Yes |

Referring to tables 1 and 2, when the first intermediate layer is provided on the cover substrate, the electrode layer is provided on the first intermediate layer, and the second intermediate layer is provided on the electrode layer, the strength of the cover substrate can be improved, and the electrode pattern may not be viewed.

However, when an electrode is directly provided on the cover substrate, the strength of the cover substrate is deteriorated. In addition, when an electrode is provided on an index matching layer after the index matching layer is provided on the cover substrate, the electrode pattern is not viewed, but the strength of the cover substrate is deteriorated.

Although the electrode pattern is not viewed in embodiments 1 and 2 in which the difference in a refractive index between the first and second intermediate layers is 0.2 or more, the electrode pattern is viewed in comparative example 3 in which the difference in the refractive index between the first and second intermediate layers is less than 0.2.

In other words, according to the touch window of the embodiment, the first intermediate layer is formed on the cover substrate, the electrode layer is formed on the first intermediate layer, and the second intermediate layer is formed on the electrode layer, thereby preventing the strength of the cover substrate from being deteriorated due to the process of forming the electrode layer, and thereby improving pattern visibility.

The touch window according to the embodiment can have improved reliability.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
an upper substrate including an active area and an inactive area;
a first intermediate layer on the upper substrate;
a printing layer having a structure of a plurality of layers and comprising an upper surface, a bottom surface, and a curved lateral surface connecting the upper surface and the bottom surface;
an electrode layer on the first intermediate layer;
a second intermediate layer on the electrode layer, and
a third intermediate layer provided on at least one of one surface and an opposite surface of the first intermediate layer,
wherein the first intermediate layer has a refractive index different from a refractive index of the second intermediate layer,
wherein the first intermediate layer includes a layer of an organic substance comprising resin,
wherein the first intermediate layer has a thickness in a range of 1 μm to 15 μm,
wherein the electrode layer comprises a sensing electrode and a wire electrode connected with the sensing electrode,
wherein the second intermediate layer covers a top surface and a lateral side of the sensing electrode,
wherein the second intermediate layer includes a layer of an organic substance comprising resin,
wherein a thickness of the second intermediate layer is in a range of 1 μm to 10 μm,
wherein the third intermediate layer is in direct contact with the first intermediate layer,
wherein the printing layer is only provided on the inactive area; and
wherein the first intermediate layer is only provided on the active area.

2. The touch window of claim 1, wherein the refractive index of the second intermediate layer is greater than the refractive index of the first intermediate layer.

3. The touch window of claim 1, wherein a difference between the refractive index of the first intermediate layer and the refractive index of the second intermediate layer is 0.2 or more.

4. The touch window of claim 1, wherein at least one of the sensing electrode and the wire electrode has a shape of a mesh.

5. The touch window of claim 1, wherein the third intermediate layer comprises an inorganic substance.

6. The touch window of claim 1, wherein the third intermediate layer comprises at least one of $SiO_2$, $TiO_2$, $Fe_2O_3$, $ZrO_2$, $Al_2O_3$, $Y_2O_3$, MgO, and $Cr_2O_3$.

7. The touch window of claim 1, wherein the first to third intermediate layers have mutually different thicknesses.

8. The touch window of claim 1, wherein at least one of the first and second intermediate layers has a thickness greater than a thickness of the third intermediate layer.

9. The touch window of claim 1, wherein the third intermediate layer has a thickness in a range of 5 nm to 30 nm.

10. The touch window of claim 1, wherein the electrode layer comprises a first electrode layer and a second electrode layer, wherein the electrode layer senses a touch position, and wherein the first electrode layer is provided on the first intermediate layer, the second electrode layer is provided on the second intermediate layer, and the first electrode layer crosses the second electrode layer.

11. The touch window of claim 1, wherein the electrode layer comprises a first sensing electrode and a second sensing electrode extending in mutually different directions, and the first and second sensing electrodes are provided on a same surface of the first intermediate layer.

12. The touch window of claim 1, further comprising a lower substrate on the second intermediate layer, wherein the electrode layer comprises a first sensing electrode and a second sensing electrode extending in mutually different directions, the first sensing electrode is provided on the first intermediate layer, and the second sensing electrode is provided on the lower substrate.

13. The touch window of claim 1, wherein the upper substrate comprises an active area and an inactive area, the sensing electrode is on the active area and the wire electrode is disposed on the inactive area, and the first intermediate layer is interposed between the printing layer and a wire electrode layer.

14. The touch window of claim 1, wherein the second intermediate layer covers the sensing electrode and the wire electrode.

15. The touch window of claim 14, wherein the second intermediate layer covers at least one of a top surface and a lateral side of the wire electrode.

16. The touch window of claim 1, wherein the sensing electrode comprises a first sensing electrode and a second sensing electrode, the first sensing electrode is provided on the first intermediate layer, the second sensing electrode is provided on the second intermediate layer, and the first sensing electrode crosses the second sensing electrode.

* * * * *